US011635907B2

(12) United States Patent
Meredith et al.

(10) Patent No.: US 11,635,907 B2
(45) Date of Patent: *Apr. 25, 2023

(54) RECORD INFORMATION MANAGEMENT BASED ON SELF-DESCRIBING ATTRIBUTES

(71) Applicant: AT&T INTELLECTUAL PROPERTY I, L.P., Atlanta, GA (US)

(72) Inventors: Sheldon Kent Meredith, Roswell, GA (US); Biren Parekh, Alpharetta, GA (US); William C. Cottrill, Canton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/446,443

(22) Filed: Aug. 30, 2021

(65) Prior Publication Data

US 2022/0019368 A1    Jan. 20, 2022

Related U.S. Application Data

(63) Continuation of application No. 16/198,438, filed on Nov. 21, 2018, now Pat. No. 11,106,378.

(51) Int. Cl.
*G06F 3/06* (2006.01)
*G06F 16/16* (2019.01)

(52) U.S. Cl.
CPC .......... *G06F 3/0647* (2013.01); *G06F 3/0604* (2013.01); *G06F 3/0605* (2013.01);
(Continued)

(58) Field of Classification Search
None
See application file for complete search history.

(56) References Cited

U.S. PATENT DOCUMENTS 6,198,438 B1    3/2001    Herd et al.
6,438,555 B1    8/2002    Orton
(Continued)

FOREIGN PATENT DOCUMENTS

EP    1085433 A2    3/2001
WO    1997027703    7/1997

OTHER PUBLICATIONS

Webopedia, "HSM", May 11, 2017, pp. 1-2, https://web.archive.org/web/20170511175412/https://www.webopedia.com/TERM/H/HSM.html (Year: 2017).
(Continued)

*Primary Examiner* — Christopher D Birkhimer

(57) ABSTRACT

In one example, a processing system may identify a type of data contained in a first dataset that is to be stored in a storage array, wherein the storage array comprises a plurality of storage zones, and wherein the plurality of storage zones includes at least two different types of storage technologies. The processing system may generate a metadata file for the first dataset that contains self-describing information for the first dataset, wherein the metadata file is generated based on the type of the data, and wherein the self-describing information defines a manner, a time, and a location for storing the first dataset. The processing system may send the first dataset to a first storage zone of the plurality of storage zones, wherein the self-describing information includes an instruction to send the first dataset to the first storage zone for at least a defined period of time.

20 Claims, 4 Drawing Sheets

(52) U.S. Cl.
CPC ............ *G06F 3/067* (2013.01); *G06F 3/0638* (2013.01); *G06F 3/0649* (2013.01); *G06F 3/0685* (2013.01); *G06F 3/0689* (2013.01); *G06F 16/164* (2019.01)

(56) References Cited

U.S. PATENT DOCUMENTS

| | | |
|---|---|---|
| 6,678,788 B1 | 1/2004 | OConnell |
| 6,944,654 B1 | 9/2005 | Murphy et al. |
| 7,970,991 B2 | 6/2011 | Abe |
| 8,159,329 B1 | 4/2012 | Killian |
| 8,171,337 B2 | 5/2012 | Peters et al. |
| 8,180,742 B2 | 5/2012 | Claudatos |
| 8,229,904 B2 | 7/2012 | Claudatos et al. |
| 8,285,671 B2 | 10/2012 | Prahlad et al. |
| 8,386,418 B2 | 2/2013 | Birch et al. |
| 8,542,098 B2 | 9/2013 | Killian et al. |
| 8,688,900 B2 | 4/2014 | Eleftheriou et al. |
| 8,819,358 B2 | 8/2014 | Ye et al. |
| 8,832,325 B1 | 9/2014 | George et al. |
| 8,849,761 B2 | 9/2014 | Prahlad et al. |
| 8,849,955 B2 | 9/2014 | Prahlad et al. |
| 8,874,835 B1 | 10/2014 | Davis et al. |
| 8,880,821 B1 | 11/2014 | Li et al. |
| 8,903,876 B2 | 12/2014 | Michael et al. |
| 9,002,904 B1 | 4/2015 | Meiri et al. |
| 9,047,189 B1 | 6/2015 | Gupta et al. |
| 9,092,441 B1 | 7/2015 | Patiejunas et al. |
| 9,268,780 B2 | 2/2016 | Claudatos et al. |
| 9,274,710 B1 | 3/2016 | Oikarinen et al. |
| 9,274,941 B1 | 3/2016 | Throop et al. |
| 9,396,198 B2 | 7/2016 | Takaoka et al. |
| 9,438,534 B2 | 9/2016 | Xia et al. |
| 9,588,992 B2 | 3/2017 | Filman et al. |
| 9,612,953 B1 | 4/2017 | Davis et al. |
| 9,652,612 B2 | 5/2017 | Brech et al. |
| 9,665,291 B2 | 5/2017 | Lin et al. |
| 9,710,407 B2 | 7/2017 | Oikarinen et al. |
| 9,720,935 B2 | 8/2017 | Hunt |
| 9,733,848 B2 | 8/2017 | Gu et al. |
| 9,740,371 B2 | 8/2017 | Blumenfeld |
| 9,772,787 B2 | 9/2017 | Oikarinen et al. |
| 9,779,015 B1 | 10/2017 | Oikarinen et al. |
| 9,870,511 B2 | 1/2018 | Mittal et al. |
| 9,880,776 B1 | 1/2018 | Tsaur et al. |
| 9,923,969 B2 | 3/2018 | Mortazavi et al. |
| 9,942,275 B2 | 4/2018 | Lietz et al. |
| 10,043,007 B2 | 8/2018 | Brech et al. |
| 10,048,869 B2 | 8/2018 | Bish et al. |
| 10,061,772 B2 | 8/2018 | Haustein et al. |
| 10,075,834 B1 | 9/2018 | Kodaypak et al. |
| 10,095,866 B2 | 10/2018 | Gong et al. |
| 10,097,973 B2 | 10/2018 | Gross et al. |
| 10,101,922 B1 | 10/2018 | Bernal et al. |
| 10,120,893 B1 | 11/2018 | Rocamora et al. |
| 10,122,777 B2 | 11/2018 | Clinton |
| 2004/0117414 A1 | 6/2004 | Braun et al. |
| 2006/0004957 A1 | 1/2006 | Hand et al. |
| 2006/0095435 A1 | 5/2006 | Johnson |
| 2006/0218207 A1 | 9/2006 | Nonaka |
| 2007/0106710 A1 | 5/2007 | Haustein et al. |
| 2008/0007781 A1 | 1/2008 | Oike et al. |
| 2009/0276565 A1 | 11/2009 | Fujibayashi et al. |
| 2013/0185503 A1 | 7/2013 | Bhatta |
| 2014/0181400 A1 | 6/2014 | Lin et al. |
| 2015/0242136 A1 | 8/2015 | Lin et al. |
| 2015/0277802 A1 | 10/2015 | Oikarinen et al. |
| 2015/0280959 A1 | 10/2015 | Vincent |
| 2015/0381725 A1 | 12/2015 | Haapaoja et al. |
| 2016/0034712 A1 | 2/2016 | Patton et al. |
| 2016/0077747 A1 | 3/2016 | Snaman, Jr. |
| 2016/0105378 A1 | 4/2016 | Xia et al. |
| 2016/0173399 A1 | 6/2016 | Sporri |
| 2016/0179711 A1 | 6/2016 | Oikarinen et al. |
| 2016/0283713 A1 | 9/2016 | Brech et al. |
| 2016/0291877 A1 | 10/2016 | Higuchi et al. |
| 2016/0337406 A1 | 11/2016 | Lietz et al. |
| 2016/0349997 A1 | 12/2016 | Saliba |
| 2017/0017401 A1 | 1/2017 | Grube et al. |
| 2017/0075886 A1 | 3/2017 | Moore et al. |
| 2017/0206352 A1 | 7/2017 | Brech et al. |
| 2017/0235537 A1 | 8/2017 | Liu et al. |
| 2017/0262477 A1 | 9/2017 | Carroll |
| 2017/0277435 A1 | 9/2017 | Wadhwa et al. |
| 2017/0277709 A1 | 9/2017 | Strauss et al. |
| 2017/0289080 A1 | 10/2017 | Borenstein et al. |
| 2017/0330150 A1 | 11/2017 | Foley et al. |
| 2017/0352020 A1 | 12/2017 | Jaeger et al. |
| 2018/0007202 A1 | 1/2018 | Batlle |
| 2018/0007203 A1 | 1/2018 | Batlle |
| 2018/0018103 A1 | 1/2018 | Bish et al. |
| 2018/0018393 A1 | 1/2018 | Latapie et al. |
| 2018/0025096 A1 | 1/2018 | Iizawa |
| 2018/0137199 A1 | 5/2018 | Miller et al. |
| 2018/0143764 A1 | 5/2018 | Araki |
| 2018/0150243 A1 | 5/2018 | Beard |
| 2018/0225051 A1 | 8/2018 | Vansa |
| 2018/0227604 A1 | 8/2018 | Warren |
| 2018/0300478 A1 | 10/2018 | Brech et al. |
| 2018/0300479 A1 | 10/2018 | Brech et al. |
| 2018/0310121 A1 | 10/2018 | Milton et al. |

OTHER PUBLICATIONS

Webopedia, "delete", Apr. 28, 2015, pp. 1-3, https://web.archive.org/web/20150428072620/https://www.webopedia.com/TERMID/delete.html (Year: 2015).

Webopedia, "secure delete", Apr. 1, 2015, pp. 1-2, https://web.archive.org/web/20150401031415/https://www.webopedia.com/TERM/S/secure-delete.html (Year: 2015).

Webopedia, "data migration", Apr. 3, 2015, pp. 1-2, https://web.archive.org/web/20150403000150/https://www.webopedia.com/TERM/D/data_migration.html (Year: 2015).

Anonymous, "HDD vs SSD", Sep. 7, 2011, pp. 1-5, https://web.archive.org/web/20110907070701/https://www.diffen.com/difference/HDD_vs_SSD (Year: 2011).

Anonymous, "What is machine learning?", Aug. 15, 2014, pp. 1-7, https://web.archive.org/web/20140815130801/https:// www.sas.com/en_us/insights/analytics/machine-learning.html#close (Year: 2014).

Mark, Leo, and Nick Roussopoulos. "Information interchange between self-describing databases." Information Systems 15.4 (1990): 393-400. http://booksc.xyz/book/2847569/f92bf1.

Nam, Beomseok, and Alan Sussman. "Improving access to multi-dimensional self-describing scientific datasets." Cluster Computing and the Grid, 2003. Proceedings. CCGrid 2003, 3rd IEEE/ACM International Symposium, IEEE, 2003. https://pdfs.semanticscholar.org/e683/4abfa283ce8372a8fff0eb98ca7bc2f504b6.pdf.

Dailey, D., David Meyers, and N. Friedland. "Self-describing data transfer methodology for intelligent transportation systems applications." Transportation Research Record: Journal of the Transportation Research Board 1660 (1999): 140-147. http://citeseerx.ist.psu.edu/viewdoc/download?doi=10.1.1.140.9038&rep=rep1&type=pdf.

Dailey, Daniel J., et al. "A self-describing data transfer model for ITS applications." IEEE Transactions on Intelligent Transportation Systems 3.4 (2002): 293-300. https://pdfs.semanticscholar.org/d312/6c8b1b1309533050aa3fe60edde4fb73c886.pdf.

RECORD INFORMATION MANAGEMENT BASED ON SELF-DESCRIBING ATTRIBUTES

This application is a continuation of U.S. patent application Ser. No. 16/198,438, filed Nov. 21, 2018, now U.S. Pat. No. 11,106,378, which is herein incorporated by reference in its entirety.

The present disclosure relates generally to dataset storage and access, and relates more particularly to methods, computer-readable media, and devices for managing record information based on self-describing attributes which indicate how, when, and where to store data over the data's useful lifetime.

BACKGROUND

Data is being created constantly. For example, millions of lines of data may be generated in parallel from hundreds of different systems in a single network. Predictive analytics can be used to extract value from these massive datasets. For instance, analysis of datasets may yield correlations that can be used to identify business trends, prevent crimes, limit disease outbreaks, and the like. As such, data is becoming an increasingly valuable asset.

SUMMARY

In one example, the present disclosure describes a method, computer readable medium and device for record information management based on self-describing attributes. For instance, in one example, a processing system may identify a type of data contained in a first dataset that is to be stored in a storage array, wherein the storage array comprises a plurality of storage zones, and wherein the plurality of storage zones includes at least two different types of storage technologies. The processing system may generate a metadata file for the first dataset that contains self-describing information for the first dataset, wherein the metadata file is generated based on the type of the data, and wherein the self-describing information defines a manner, a time, and a location for storing the first dataset. The processing system may send the first dataset to a first storage zone of the plurality of storage zones, wherein the self-describing information includes an instruction to send the first dataset to the first storage zone for at least a defined period of time.

In another example, a non-transitory computer-readable storage medium may store instructions which, when executed by a processing system, cause the processing system to perform operations. The operations may include identifying a type of data contained in a first dataset that is to be stored in a storage array, wherein the storage array comprises a plurality of storage zones, and wherein the plurality of storage zones includes at least two different types of storage technologies, generating a metadata file for the first dataset that contains self-describing information for the first dataset, wherein the metadata file is generated based on the type of the data, and wherein the self-describing information defines a manner, a time, and a location for storing the first dataset, and sending the first dataset to a first storage zone of the plurality of storage zones, wherein the self-describing information includes an instruction to send the first dataset to the first storage zone for at least a defined period of time.

In another example, a system may include a storage array including a plurality of storage zones, wherein the plurality of storage zones includes at least two different types of storage technologies, a processing system including at least one processor, and a computer-readable medium storing instructions which, when executed by the processing system, cause the processing system to perform operations. The operations may include identifying a type of data contained in a first dataset that is to be stored in the storage array, generating a metadata file for the first dataset that contains self-describing information for the first dataset, wherein the metadata file is generated based on the type of the data, and wherein the self-describing information defines a manner, a time, and a location for storing the first dataset, and sending the first dataset to a first storage zone of the plurality of storage zones, wherein the self-describing information includes an instruction to send the first dataset to the first storage zone for at least a defined period of time.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
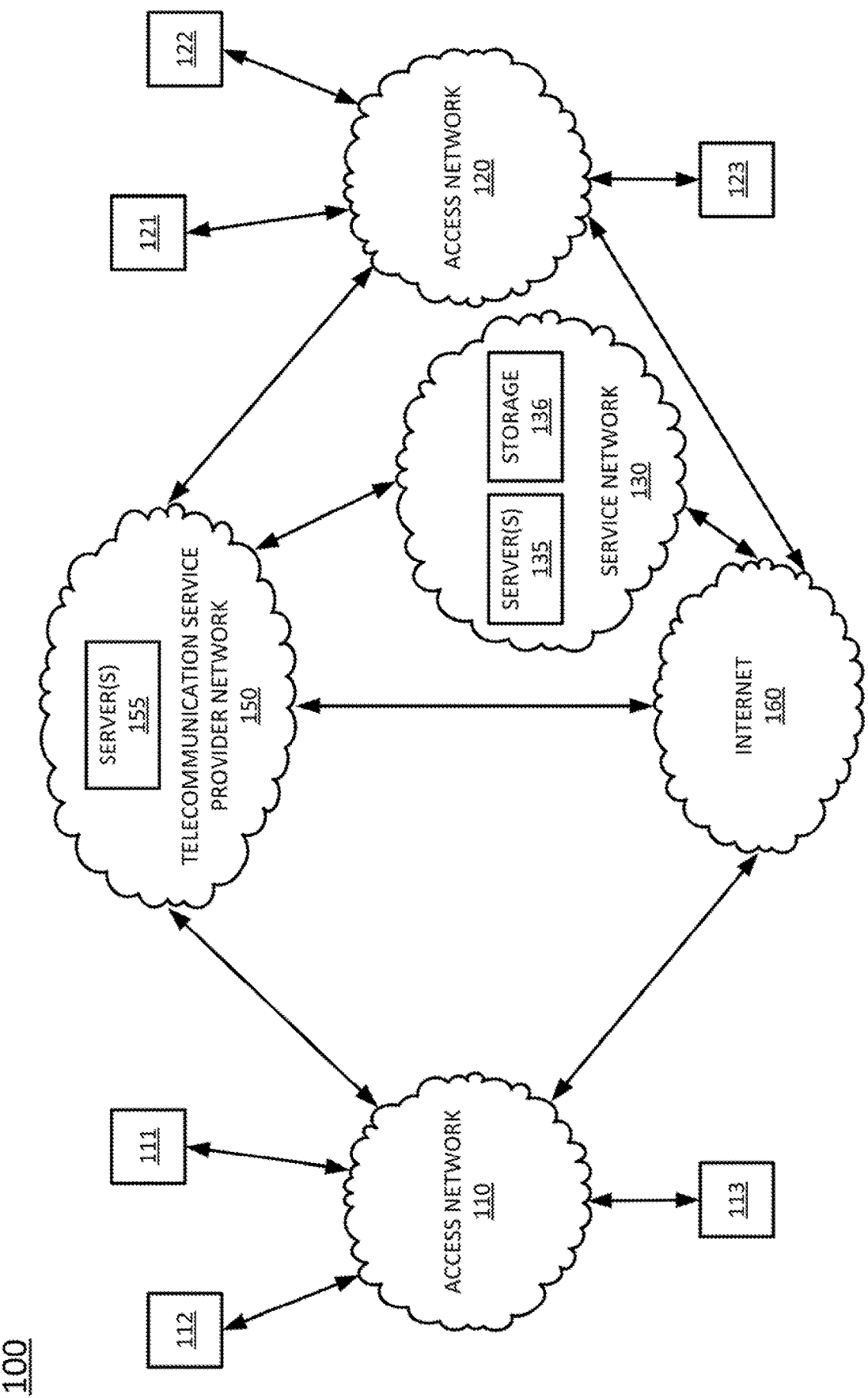
FIG. 1 illustrates one example of a system related to the present disclosure.

The present disclosure broadly discloses devices, non-transitory (i.e., tangible or physical) computer-readable storage media, and methods for record information management based on self-describing attributes. As discussed above, data is becoming an increasingly valuable asset. However, as the value of data grows, it also becomes increasingly challenging to store large datasets in an affordable manner that also allows for fast access when needed. Computer memory, for example, may allow for fast access, but is expensive. Less expensive storage options such as backup tapes, however, do not provide the access speeds that many data-driven applications require. Between these two extremes are many other storage options with varying levels of storage cost, latency, and robustness, such as redundant array of independent disks (RAID) architectures and enterprise grade storage.

Examples of the present disclosure optimize data access latency and robustness while minimizing storage costs for large datasets. In one example, a data storage system may include a plurality of storage "zones," where each storage zone may comprise a different type of storage technology (e.g., level 1 cache, virtual machine, tape drive, etc.). This allows datasets to be moved to different storage zones having different latencies and associated costs based on the probability of the datasets being accessed (e.g., as data ages, the probability of the data being accessed typically decreases). The data storage system may automatically process, transform, and/or abstract incoming data, move data between storage zones, replicate data, compress data, and/or modify data based on metadata that is appended to the incoming data based on learned information.

In particular, to facilitate proper handling of incoming datasets, each dataset may be provided, upon creation, with self-describing information which indicates a manner, a time, and a location for storing the first dataset over the data's useful lifetime, as well as any types of processing that the data should experience when arriving at various storage zones. The manner for storing the first dataset may include, for example, any processes that are to be applied to the first dataset while the first dataset is stored in a storage array or in a specific storage zone of a storage array (e.g., "Apply Process X while in Storage Zone A"). The time for storing the first dataset may include, for example, a maximum amount of time for which the first dataset is to be stored in a storage array or in a specific storage zone of a storage array (e.g., "Move from Storage Zone A to Storage Zone B when a dataset reaches y hours old"). The location for storing the data may include, for example, a specific storage zone of a storage array in which the first dataset should be stored at a given time (e.g., "Store in Storage Zone A upon receipt of dataset"). Other examples of manners, times, and locations for storing datasets are discussed in further detail below.

The self-describing data may also include ownership and notification information, so that the owner of the dataset is notified of any automatic movement of the data between storage zones. Machine learning techniques may be used to learn how specific datasets and similar datasets have been handled historically in the data storage system (e.g., where the datasets are stored and when, what kinds of processing the datasets are subjected to, etc.), and this learned information may be used to generate the appropriate self-describing information for each incoming dataset to ensure proper downstream handling.

The disclosed data storage system thus allows datasets to be optimally managed for usability and resource allocation, particularly within cloud or virtual processing and storage environments. Rules for handling datasets may evolve over time as the machine learning techniques learn how various datasets are used in processing.

To aid in understanding the present disclosure, FIG. 1 illustrates an example system 100 comprising a plurality of different networks in which examples of the present disclosure for record information management based on self-describing attributes may operate. Telecommunication service provider network 150 may comprise a core network with components for telephone services, Internet or data services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing system, such as computing system 400 depicted in FIG. 4, and may be configured to host one or more centralized system components in accordance with the present disclosure. For example, a first centralized system component may comprise a database of assigned telephone numbers, a second centralized system component may comprise a database of basic customer account information for all or a portion of the customers/subscribers of the telecommunication service provider network 150, a third centralized system component may comprise a cellular network service home location register (HLR), e.g., with current serving base station information of various subscribers, and so forth. Other centralized system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other centralized system components may include, for example, a layer 3 router, a short message service (SMS) server, a voicemail server, a video-on-demand server, a server for network traffic analysis, and so forth. It should be noted that in one example, a centralized system component may be hosted on a single server, while in another example, a centralized system component may be hosted on multiple servers, e.g., in a distributed manner. For ease of illustration, various other components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone (e.g., for analog or digital telephony), a mobile device (e.g., such as a cellular smart phone, a laptop, a tablet computer, etc.), a router, a gateway, a desktop computer, a plurality or cluster of such devices, a television (TV) (e.g., a "smart" TV), a set-top box (STB), a gaming console, a wearable "smart" device (e.g., a smart watch or a fitness tracker), a head mounted display (HMD), and the like. In one example, any one or more of the endpoint devices 111-113 and 121-123 may represent one or more user devices and/or one or more servers of one or more dataset owners, such as a weather data service, a traffic management service (such as a state or local transportation authority, a toll collection service, etc.), a payment processing service (e.g., a credit card company, a retailer, etc.), a police, fire, or emergency medical service, and so on.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide mobile core network functions, e.g., of a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, data, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and/or users. For example, telecommunication service provider network 150 may provide a cloud storage service, web server hosting, and other services. As such, service network 130 may represent aspects of telecommunication service provider network 150 where infrastructure for supporting such services may be deployed. In another example, service network 130 may represent a third-party network, e.g., a network of an entity that provides a service for record information management based on self-describing attributes, in accordance with the present disclosure.

In the example of FIG. 1, service network 130 may include one or more servers 135 which may each comprise all or a portion of a computing device or system, such as computing system 400, and/or processing system 402 as described in connection with FIG. 4 below, specifically configured to perform various steps, functions, and/or operations for record information management based on self-describing attributes, as described herein. For example, one of server(s) 135, or a plurality of servers 135 collectively, may perform operations in connection with the example method 300, or as otherwise described herein. In one example, the one or more of the servers 135 may comprise a data processing engine.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, service network 130 may also include a storage, e.g., a storage array 136, e.g., one or more physical storage devices integrated with server(s) 135 (e.g., database servers), attached or coupled to the server(s) 135, and/or in remote communication with server(s) 135 to store datasets generated in the network 100, as described herein. As just one example, the storage array 136 may be configured to receive and store network operational data collected from the telecommunication service provider network 150, such as call logs, mobile device location data, control plane signaling and/or session management messages, data traffic volume records, call detail records (CDRs), error reports, network impairment records, performance logs, alarm data, and other information and statistics, which may then be compiled and processed, e.g., normalized, transformed, tagged, etc., and forwarded to the storage array 136, via one or more of the servers 135.

Similarly, the storage array 136 may receive and store weather data from a device of a third-party, e.g., a weather service, a traffic management service, etc. via one of the access networks 110 or 120. For instance, one of endpoint devices 111-113 or 121-123 may represent a weather data server (WDS). In one example, the weather data may be received via a weather service data feed, e.g., an NWS extensible markup language (XML) data feed, or the like. In another example, the weather data may be obtained by retrieving the weather data from the WDS. In one example, storage array 136 may receive and store weather data from multiple third-parties. Similarly, one of endpoint devices 111-113 or 121-123 may represent a server of a traffic management service and may forward various traffic related data to the storage array 136, such as toll payment data, records of traffic volume estimates, traffic signal timing information, and so forth. In one example, server(s) 135 and/or storage array 136 may comprise cloud-based and/or distributed data storage and/or processing systems comprising one or more servers at a same location or at different locations.

Figure 2:
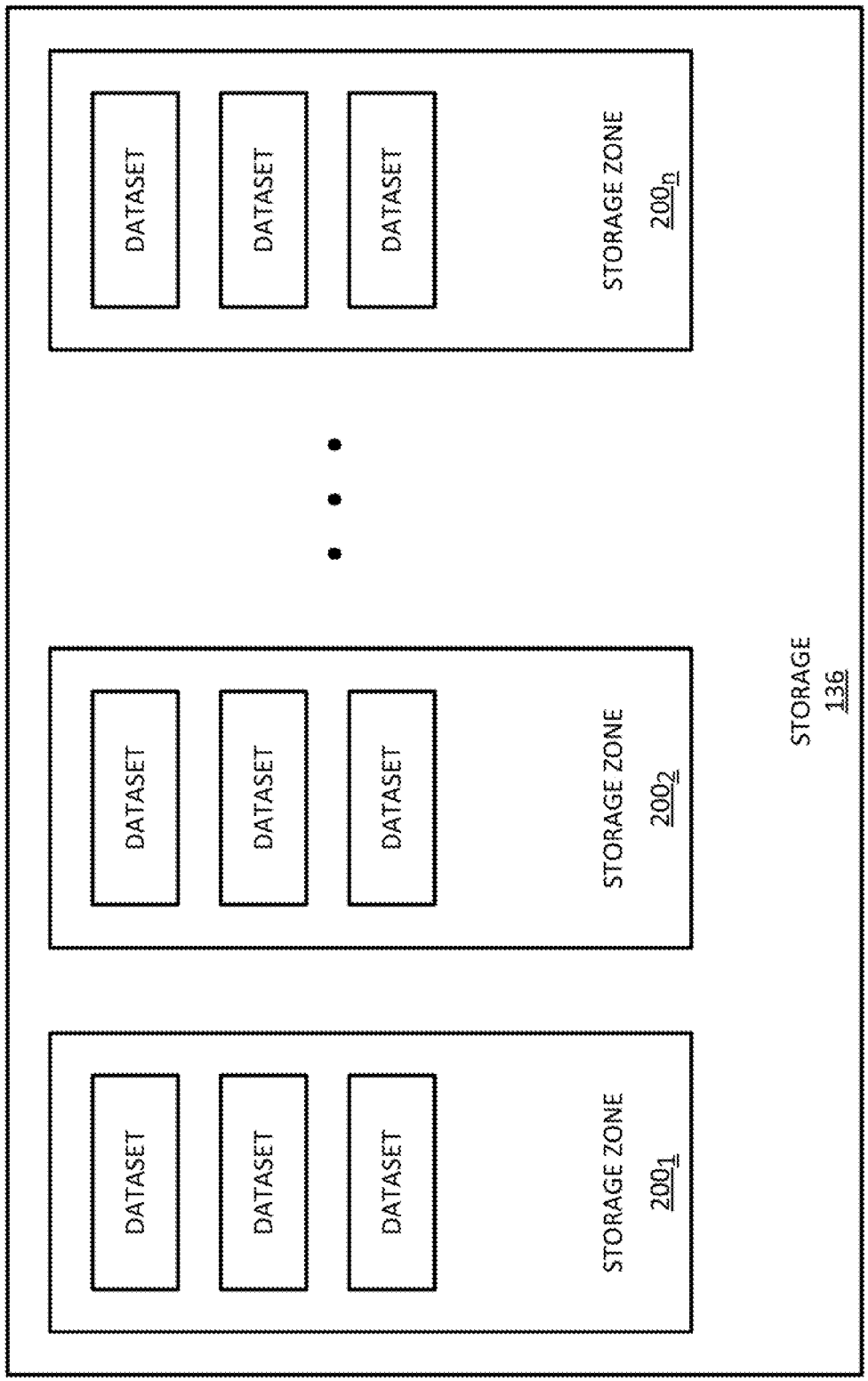
FIG. 2 illustrates an example of the storage array of FIG. 1, according to the present disclosure.

FIG. 2 illustrates an example of the storage array 136 of FIG. 1, according to the present disclosure. In one example, the storage array 136 comprises a plurality of storage zones $200_1$-$200_n$ (hereinafter individually referred to as a "storage zone 200" or collectively referred to as "storage zones 200"). Each of the storage zones is configured to store one or more datasets.

In one example, the plurality of storage zones 200 includes at least two different types of storage technologies. For instance, the various storage zones may range from high-cost, low-latency storage technologies to low-cost, high-latency storage technologies and various storage technologies in between. These storage technologies may include level 1 cache, virtual machines, distributed file systems (e.g., Hadoop® Distributed File Systems (HDFS™)), RAID architectures, consumer grade storage, enterprise grade storage, high-performance databases (e.g., Oracle® or Teradata® databases), tape drives, or the like. Thus, a first storage zone $200_1$ might comprise a level 1 cache, a second storage zone $200_2$ might comprise a virtual machine, and a third storage zone $200_n$ might comprise a tape drive. In one particular example, the storage zones 200 include the following types of storage prioritized in the following order (where higher ranking storage types may be used to store more frequently accessed or more important data): (1) processor cache; (2) computer memory; (3) database; (4) enterprise RAID storage; (5) non-enterprise RAID storage; and (6) mechanically archived storage. As discussed in further detail below in conjunction with FIG. 3, a dataset may be moved among these storage zones 200 based on self-describing data.

Referring back to FIG. 1, as mentioned above, any one or more of the endpoint devices 111-113 and/or endpoint devices 121-123 may comprise devices of dataset owners for uploading and offering data sets for sharing, purchase, lease, download, licensing, etc. via server(s) 135. In this regard, server(s) 135 may maintain communications with one or more of the user devices 111-113 and/or user devices 121-123 via access networks 110 and 120, telecommunication service provider network 140, Internet 160, and so forth. Various additional functions of server(s) 135 in connection with record information management based on self-describing attributes are described in greater detail below in connection with the examples of FIG. 3.

In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and storage array 136 may be distributed at different locations, such as in or connected to access networks 110 and 120, in another service network connected to Internet 160 (e.g., a cloud computing provider), in telecommunication service provider network 150, and so forth. Thus, these and other modifications are all contemplated within the scope of the present disclosure.

Figure 3:
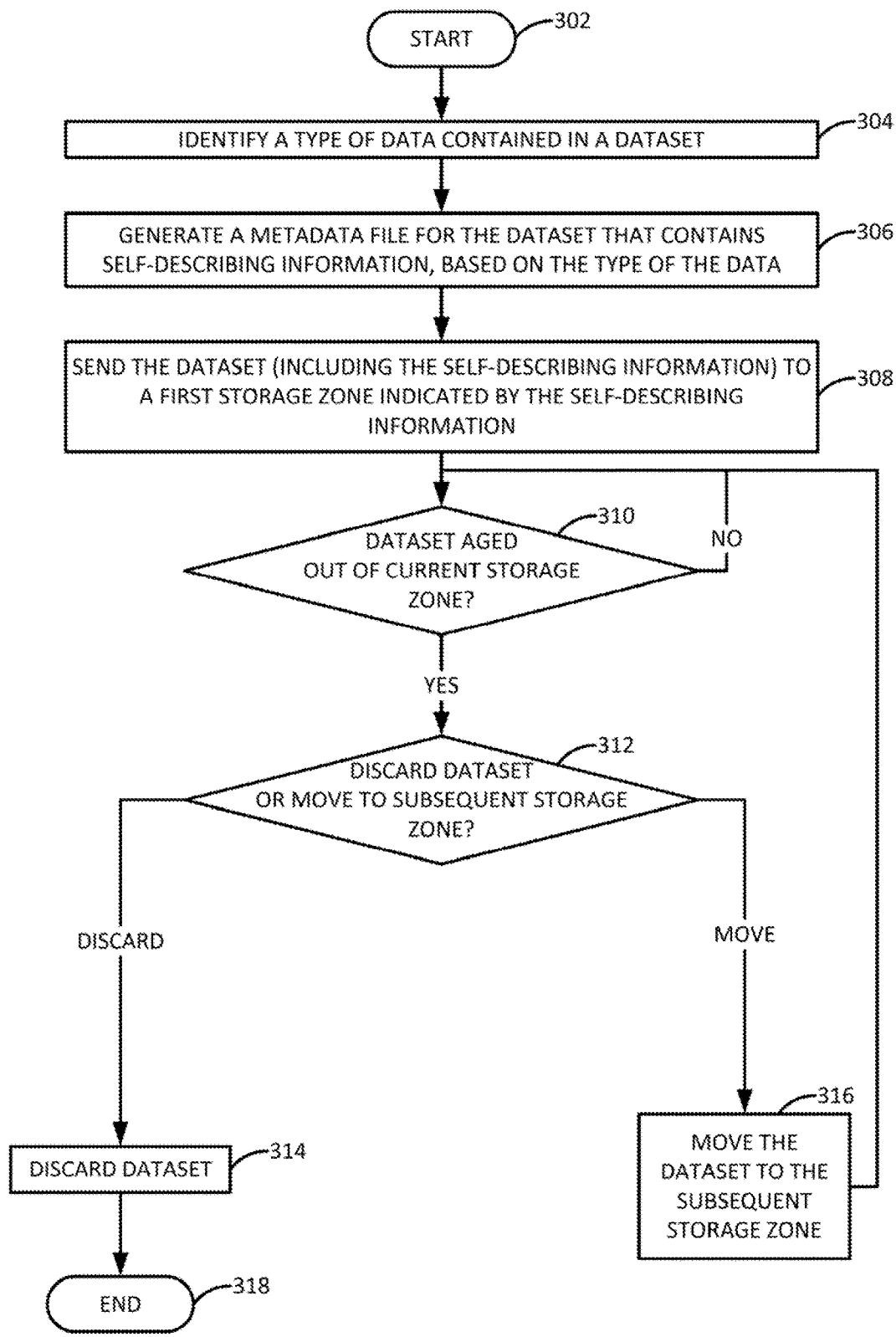
FIG. 3 illustrates an example flowchart of a method for record information management based on self-describing attributes.

FIG. 3 illustrates an example flowchart of a method 300 for record information management based on self-describing attributes. In one example, steps, functions, and/or operations of the method 300 may be performed by a device as illustrated in FIG. 1, e.g., one or more of servers 135. Alternatively, or in addition, the steps, functions and/or operations of the method 300 may be performed by a processing system collectively comprising a plurality of devices as illustrated in FIG. 1 such as one or more of the servers 135, storage arrays 136, endpoint devices 111-113 and/or 121-123. In one example, the steps, functions, or operations of method 300 may be performed by a computing device or system 400, and/or a processing system 402 as described in connection with FIG. 4 below. For instance, the computing device 400 may represent at least a portion of a platform, a server, a system, and so forth, in accordance with the present disclosure. For illustrative purposes, the method 300 is described in greater detail below in connection with an example performed by a processing system. The method 300 begins in step 302 and proceeds to step 304.

At step 304, the processing system may identify the type of data contained in a dataset. For instance, as described above, the dataset may comprise location data, calling data, weather data, traffic management data, payment processing data, emergency service data, and so on. The dataset may be a newly obtained dataset, e.g., obtained from a user device and/or server of a dataset owner. In one example, metadata associated with the dataset may indicate the type of the data contained in the dataset. This metadata may be defined by the source of the dataset.

In step 306, the processing system may generate a metadata file for the dataset that contains self-describing information, based on the type of the data contained in the dataset. The self-describing information may include standard file features such as the creation date and/or time of the dataset, the source identifier and/or network address of the source of the dataset, or the like. The self-describing information may also define a storage and retention policy for the dataset (e.g., required latency for the dataset, probability that the dataset will be accessed, an amount of time after which to delete the dataset, replication and/or redundancy requirements, etc.).

In a further example, the self-describing information also defines any post-transfer processing to be applied to the dataset upon being stored in the storage array. As an example, suppose that a first dataset comprises location data sent from an endpoint, referred to as System A, to a data plane. The self-describing information associated with the first dataset may include instructions to run a process on the dataset, referred to as Process X. Process X may be defined in a library that is available to the data plane and may, for example, use the location data in the first dataset to enhance a second dataset containing WiFi data. This would not only allow the data plane access to the raw location data in the first dataset, but it would also allow the WiFi data of the second dataset to be enhanced without requiring direct access to the second dataset by System A.

In one example, the self-describing information may define a plurality of processes to apply to the dataset and an order in which the plurality of processes is to be applied. Order is important in this case, since processes run using the original dataset may affect other datasets or storage zones. For instance, a first process may use location data in a first dataset to location-tag data in a second dataset, and a second process may then use the location-tagged data in the second dataset to look up point-of-interest references.

The self-describing information may further define execution time for any processes defined. For instance, an absolute execution timestamp may be applied to one or more of the processes so that, as the processes are executed, the processes are removed from the self-describing information (unless the processes preclude removal). As an example, data in a dataset may be used repeatedly by a process over a period of time (e.g., once a week for a time period of a month). In this case, once the process executes, the self-describing information may direct the machine executing the process to modify the execution timestamp in the self-describing information to reflect the next scheduled execution time for the process (e.g., t=t+1 week).

The self-describing information may also define processes that are not permitted to be performed on a dataset. This may imply that certain aspects of the data should be protected from downstream systems and users, which may further imply a form of read-only (e.g., public key) encryption.

Similarly, the self-describing information may define storage zones in which the dataset is not permitted to be stored. A storage zone in which the dataset is not permitted to be stored may be defined explicitly (e.g., do not store in Storage Zone Y) or implicitly through the definition of permissible time to be stored in other storage zones (e.g., do not store for more than x days in Storage Zone X or z days in storage Zone Z).

Thus, the self-describing information may define, among other things, how, when, and where to store the data over the data's useful lifetime. In one example, the self-describing information may be learned (e.g., using a machine learning technique) through observations of how datasets containing the same type of data as the present dataset have historically been handled (e.g., how, when, and where these datasets have historically been stored and/or processed). For instance, a machine learning technique may monitor how often a particular file and files of the same "type" are accessed in different storage zones and what sorts of processes are run using the files. As an example, files of a particular type may tend to be accessed heavily for the first day after their receipt from a source system and storage in the storage array. However, files of this particular type may accessed infrequently after that first day. As such, a storage routine may be learned in which files of this particular type are automatically stored in a first, low-latency storage zone (e.g., computer memory) for the first day (when probability of access is high), but after the first day (when probability of access declines dramatically) are automatically moved to a second, higher-latency (and potentially less costly) storage zone (e.g., enterprise-grade storage).

In another example, the machine learning technique may detect that requests for access to certain types of data tend to come from the same location. In this case, a storage routine may be learned in which these certain types of data are stored in a storage zone that is physically located relatively close to the location from which the requests are coming, in order to reduce access latency.

In one example, learned self-describing information may overwrite any self-describing information contained in the dataset upon receipt. For instance, the source of the dataset may include self-describing information that defines a manner in which a dataset is to be stored. However, this source-defined self-describing information regarding storage may be replaced with a learned storage routine, when permitted or authorized by the owner of the dataset. In another example, however, any self-describing information provided by the source of a dataset is still given preference over a learned storage routine.

The self-describing information may subsequently be retrieved by one or more storage and/or processing systems and used to automatically store and/or process the dataset accordingly. In addition, the self-describing information may be reported back to the source of the dataset, so that the dataset creators are informed as to how their content is being used. This may also allow the creators to include similar self-describing information on similar datasets that the creators create in the future.

Once the appropriate self-describing information for the dataset type has been generated and appended to the dataset, the method 300 may proceed to step 308. In step 308, the processing system may send the dataset (which now includes the self-describing information) to a first storage zone indicated by the self-describing information, where the self-describing information indicates that the dataset should be stored in the first storage zone for at least a defined period of time. As discussed above, the first storage zone may be one of a plurality of storage zones, where the plurality of storage zones includes at least two storage zones that comprise different types of storage technologies (e.g., processor cache, computer memory, database, enterprise RAID storage, non-enterprise RAID storage, mechanically archived storage, etc.).

In step 310, the processing system may determine whether the dataset has aged out of the current (e.g., first) storage zone, based on the self-describing information. For instance, the self-describing information may define a limited period of time for which the dataset is to be stored in a given storage zone, as discussed above. This limited period of time may correspond to a period of time after which accesses to the dataset are expected to decline by some threshold amount (e.g., x percent of accesses at time of initial storage in the current storage zone).

In another example, the limited period of time may be defined by law. For instance, it may be legally impermissible to store certain types of data for longer than a threshold period of time. However, those certain types of data may still be very valuable for a short period of time following their creation.

If the processing system determines in step 310 that the dataset has not aged out of the current storage zone, then the method 300 may enter a loop. Within that loop, the dataset remains in the current storage zone until such time as the dataset ages out of the current storage zone. During this time, the dataset may be accessed from the current storage zone, and one or more processes may be run on the dataset.

However, once the dataset is determined in step 310 to have aged out of the current storage zone, then the method 300 may proceed to step 312. In step 312, the processing system may determine whether the dataset is to be discarded or moved to a subsequent (e.g., second) storage zone.

If the processing system determines in step 312 that the dataset is to be discarded, then the processing system may discard the dataset in step 314. The method 300 may then end in step 318.

If, however, the processing system determines in step 312 that the dataset is to be moved to a subsequent (e.g., second) storage zone, then the processing system may move the dataset to the subsequent storage zone in step 316. In one example, the subsequent storage zone comprises a storage technology which exhibits greater latency than the storage technology of the current storage zone, but may be lower in cost. For instance, if the current storage zone comprises computer memory, the subsequent storage zone may comprise non-enterprise RAID storage. Upon movement of the dataset to the subsequent storage zone, the subsequent storage zone becomes the "new" current storage zone.

The method 300 may then return to step 310, where the processing system determines whether the dataset has aged out of the current (e.g., second) storage zone. The method 300 then proceeds as described above, possibly continuing to move the dataset among the plurality of storage zones even though only two zones are shown in FIG. 3 (and possibly performing processing on the dataset in any of those storage zones) until the dataset is discarded. The method 300 may be repeated for each incoming dataset that is accessible to the processing system.

Thus, examples of the present disclosure simplify record information management (RIM) by allowing RIM policies, which may change over time, to attach to and travel with the datasets to which the policies apply. As RIM policies may change over time, this is an efficient way of ensuring that datasets are stored and processed in an appropriate manner. Moreover, as discussed above, it allows for easy definition of storage routines that automatically move datasets among various types of storage technologies based on the appropriate level of resources to devote to the datasets at different times. Thus, examples of the present disclosure provide an improvement over "one size fits all" architectures for storage of large datasets.

For example, consider a dataset that never needs to be stored in memory, because the latency requirements for the dataset are never observed to require retrieval speeds provided by memory. The dataset may still require retrieval speeds on par with a high-performance database, at least for the first three days after creation (after which the dataset is unlikely to be accessed). In this case, the self-describing information associated with the dataset may indicate "Store dataset in high-performance database. On day X+3[where X indicates the day on which the dataset is stored in the high-performance database], move to tape drive, and delete after move to tape drive is confirmed." Thus, storage resources can be allocated optimally to manage the necessary retrieval speeds for different datasets while respecting the costs of those storage resources.

Self-describing data also allows for easy definition of processing routines in addition to storage routines. For example, the self-describing information for a dataset X may indicate "After y minutes, move dataset X from real-time memory to Database B. When dataset X arrives in Database B, run dataset X through Process M in order to put the data into a desired indexing schema." In this case, the self-describing information continues to persist for the underlying information, e.g., such that after time X+Y+Z, instructions might include sending the dataset to HDFS storage on two redundant nodes (as opposed to three or more redundant nodes, if the data is not considered valuable enough to warrant additional redundancy).

In further examples, where datasets are replicated such that two or more instances of the same dataset exist, it should be noted that storage and processing for the two instances of the dataset need not be the same. For instance, a dataset may be moved from memory to a first database and at the same time replicated in a second database. This results in two instances of the dataset with different indexing. Moreover, the first database might send its instance of the dataset to HDFS and then delete the instance, while the second database may retain its instance of the dataset until the instance expires after a specified time.

It should be noted that the method 300 may be expanded to include additional steps or may be modified to include additional operations with respect to the steps outlined above. Moreover, although not specifically specified, one or more steps, functions or operations of the method 300 may include a storing, displaying and/or outputting step as required for a particular application. In other words, any data, records, fields, and/or intermediate results discussed in the method 300 can be stored, displayed and/or outputted either on the device executing the method 300, or to another device, as required for a particular application. Furthermore, steps, blocks, functions, or operations in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. In addition, one or more steps, blocks, functions, or operations of the above described method 300 may comprise optional steps, or can be combined, separated, and/or performed in a different order from that described above, without departing from the examples of the present disclosure.

Figure 4:
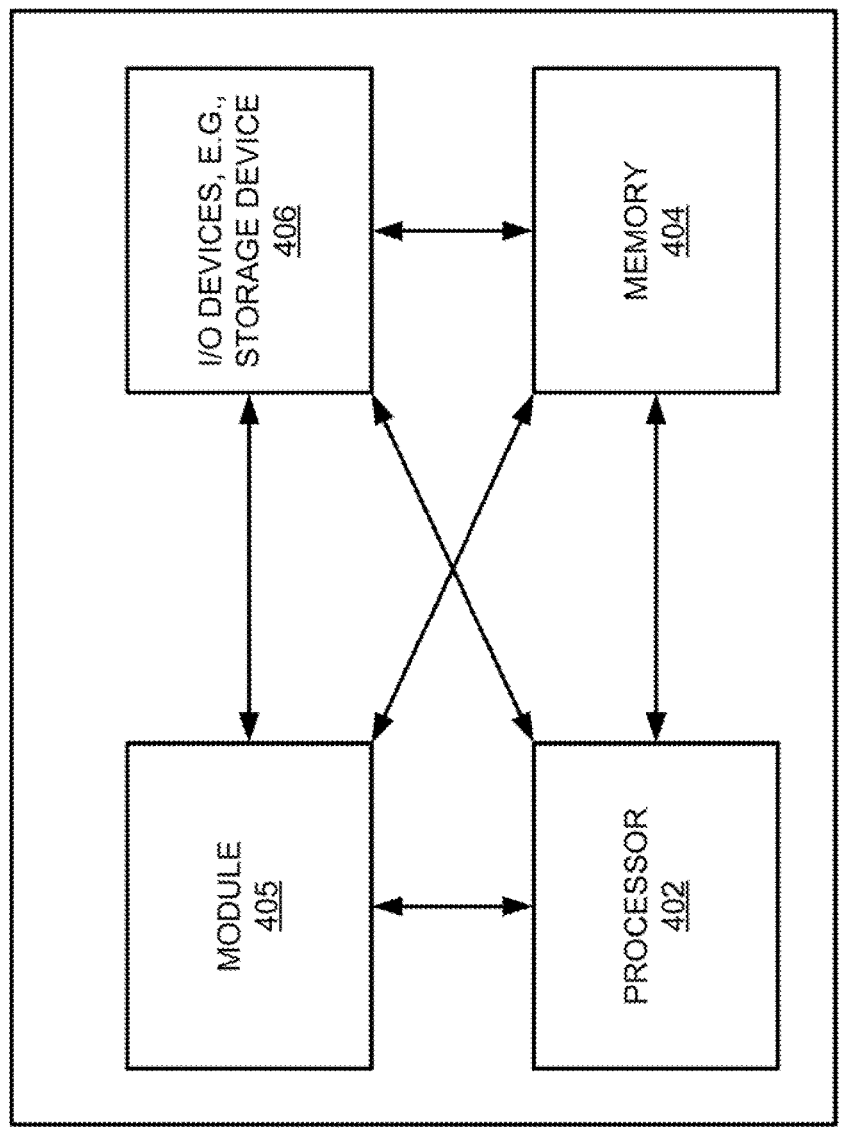
FIG. 4 illustrates a high-level block diagram of a computing device specially programmed to perform the functions described herein.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for performing record information management based on self-describing attributes, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, transceivers, power units, and so forth. Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 are implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 405 for performing record information management based on self-describing attributes (e.g., a software program comprising computer-executable instructions) can be loaded into memory 404 and executed by hardware processor element 402 to implement the steps, functions, or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for performing record information management based on self-describing attributes (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    identifying, by a processing system, a type of data contained in a first dataset that is to be stored in a storage array, wherein the storage array comprises a plurality of storage zones, and wherein the plurality of storage zones includes at least two different types of storage technologies;
    generating, by the processing system, a metadata file for the first dataset that contains self-describing information for the first dataset, wherein the metadata file is generated based on the type of the data, and wherein the self-describing information is appended to the first dataset and defines a time for storing the first dataset, a location for storing the first dataset, and a first non-storage process to be applied to the first dataset while the first dataset is stored in the storage array, wherein the first non-storage process is removed from the self-describing information once the first non-storage process is executed; and
    sending, by the processing system, the first dataset to a first storage zone of the plurality of storage zones, wherein the self-describing information includes an instruction to send the first dataset to the first storage zone for at least a defined period of time.

2. The method of claim 1, further comprising:
    determining, by the processing system, from the self-describing information that the first dataset should be moved from the first storage zone; and
    moving, by the processing system, the first dataset from the first storage zone.

3. The method of claim 2, wherein the moving comprises discarding the first dataset.

4. The method of claim 2, wherein the moving comprises:
    determining, by the processing system, from the self-describing information, that the first dataset should be moved to a second storage zone of the plurality of storage zones, wherein the second storage zone comprises a second type of storage technology that is different from a first type of storage technology of the first storage zone of the at least two different types of storage technologies; and
    moving, by the processing system, the first dataset to the second storage zone.

5. The method of claim 4, wherein the second type of storage technology has a higher latency than the first type of storage technology.

6. The method of claim 2, wherein the determining comprises detecting that the first dataset has been stored in the first storage zone for the defined period of time.

7. The method of claim 6, wherein the defined period of time corresponds to a period of time after which accesses to the first dataset are expected to decline by a threshold amount.

8. The method of claim 1, wherein the at least two different types of storage technologies comprise storage technologies having different latencies.

9. The method of claim 8, wherein the at least two different types of storage technologies are selected from a group comprising: a processor cache, a computer memory, a database, an enterprise redundant array of independent disks storage, a non-enterprise redundant array of independent disks storage, and a mechanically archived storage.

10. The method of claim 1, wherein the self-describing information further defines an order in which the first non-storage process is to be applied relative to a second non-storage process to be applied to the first dataset.

11. The method of claim 1, wherein the self-describing information further defines a required latency for the first dataset.

12. The method of claim 1, wherein the self-describing information further defines a probability that the first dataset will be accessed.

13. The method of claim 1, wherein the self-describing information further defines a replication requirement or a redundancy requirement for the first dataset.

14. The method of claim 1, wherein the generating comprises:
    identifying, by the processing system, a second dataset that was previously stored in the storage array and that contained data of a type that matches the type of the data contained in the first dataset;
    determining, by the processing system, a manner in which the second dataset was handled while stored in the storage array; and
    generating, by the processing system, the self-describing information for the first dataset based on the manner in which the second dataset was handled while stored in the storage array, such that the first dataset is handled in the manner in which the second dataset was handled.

15. The method of claim 14, wherein a machine learning technique is used to learn the manner in which the second dataset was handled while being stored in the storage array.

16. A non-transitory computer-readable storage medium storing instructions which, when executed by a processing system, cause the processing system to perform operations, the operations comprising:
- identifying a type of data contained in a first dataset that is to be stored in a storage array, wherein the storage array comprises a plurality of storage zones, and wherein the plurality of storage zones includes at least two different types of storage technologies;
- generating a metadata file for the first dataset that contains self-describing information for the first dataset, wherein the metadata file is generated based on the type of the data, and wherein the self-describing information is appended to the first dataset and defines a time for storing the first dataset, a location for storing the first dataset, and a first non-storage process to be applied to the first dataset while the first dataset is stored in the storage array, is removed from the self-describing information once the first non-storage process is executed; and
- sending the first dataset to a first storage zone of the plurality of storage zones, wherein the self-describing information includes an instruction to send the first dataset to the first storage zone for at least a defined period of time.

17. A system comprising:
- a storage array comprising a plurality of storage zones, wherein the plurality of storage zones includes at least two different types of storage technologies;
- a processing system including at least one processor; and
- a computer-readable medium storing instructions which, when executed by the processing system, cause the processing system to perform operations, the operations comprising:
  - identifying a type of data contained in a first dataset that is to be stored in the storage array;
  - generating a metadata file for the first dataset that contains self-describing information for the first dataset, wherein the metadata file is generated based on the type of the data, and wherein the self-describing information is appended to the first dataset and defines a time for storing the first dataset, a location for storing the first dataset, and a first non-storage process to be applied to the first dataset while the first dataset is stored in the storage array, is removed from the self-describing information once the first non-storage process is executed; and
  - sending the first dataset to a first storage zone of the plurality of storage zones, wherein the self-describing information includes an instruction to send the first dataset to the first storage zone for at least a defined period of time.

18. The system of claim 17, wherein the at least two different types of storage technologies comprise storage technologies having different latencies.

19. The system of claim 18, wherein the at least two different types of storage technologies are selected from a group comprising: a processor cache, a computer memory, a database, an enterprise redundant array of independent disks storage, a non-enterprise redundant array of independent disks storage, and a mechanically archived storage.

20. The system of claim 19, wherein the at least two different types of storage technologies are ranked in a prioritized order, and wherein a first type of storage technology of the at least two different types of storage technologies is ranked higher than a second type of storage technology of the at least two different types of storage technologies and is to be used to store datasets that are expected to be accessed with a greater frequency than other datasets stored in the storage array.

* * * * *